Oct. 11, 1966 M. D. BONFELD 3,278,808
SUPERCONDUCTING DEVICE
Filed Dec. 7, 1962
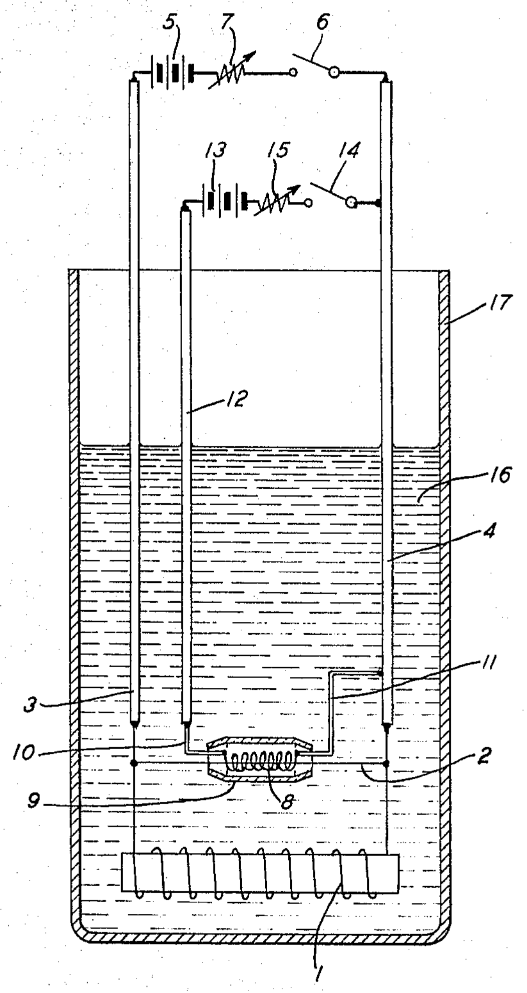
INVENTOR
M. D. BONFELD
BY [signature]
ATTORNEY

United States Patent Office 3,278,808

Patented Oct. 11, 1966

3,278,808

SUPERCONDUCTING DEVICE

Murray D. Bonfeld, Fullerton, Pa., assignor to Bell Telephone Laboratories, Incorporated, New York, N.Y., a corporation of New York Filed Dec. 7, 1962, Ser. No. 243,142
4 Claims. (Cl. 317—123)

This invention relates to superconducting devices. More particularly it concerns a method and means for obtaining a persistent current in a superconducting coil.

The generation of magnetic fields by means of superconducting coils has received much interest recently. One of the design considerations in any superconducting circuitry is the heat leak to the helium bath through the incoming leads. This heat transfer is the result of both thermal conduction and Joule heating in the leads. By setting up a closed superconducting path for the current in the coil, it is possible to disconnect the external power source thereby eliminating Joule heating in the leads except during the time necessary to initiate the persistent current.

According to the present invention a heat insulated superconducting shunt wire is affixed across the superconducting coil. Associated with this shunt is an electrical heating element which is capable of heating a portion of the shunt wire above its transition temperature thereby introducing a finite resistance in the shunt. With the coil in its superconducting state and the shunt normal, a current is fed through the coil after the initial transient. All the current flows through the coil due to the high relative resistance of the shunt. Upon de-energizing the heating coil the shunt achieves a superconducting state. At this point the current source is removed and the current switches to the superconducting shunt path leaving a persistent current flow through the coil.

The operation of this invention is illustrated in the drawing in which:

The figure is a schematic representation of a superconducting device operating according to the principles of this invention.

The figure shows a superconducting coil 1 composed of a superconducting material such as niobium or $Nb_3Sn$. Attached across the ends of the coil is a shorting strip 2 which also consists of a superconducting material, conveniently, the same material as coil 1. Attached to the ends of superconducting coil 1 are large area copper conductors 3 and 4 which provide low resistance current paths to minimize heating of the liquid helium. These leads may also be heat insulated, for instance, by ceramic sheaths. The primary current source is battery 5 connected to the conductors through switch 6 and variable resistor 7. The heating element which provides the switching action according to this invention is shown surrounding a portion of the shunt wire at 8. This element may be any of a wide variety of electrical resistance heating elements. To minimize vaporization of helium when the heating element is energized an insulating sleeve 9 is placed around the coil with the ends necked down to restrict the liquid helium flow into the hot chamber. This sleeve may consist of glass. Copper leads 10 and 11 are attached to the heating elements such that high resistance wire is confined to the interior of the sleeve. Conductor 12 is provided as shown with battery 13 connected across the heating element 8 through switch 14 and variable resistor 15. The superconducting portion of the assembly remains immersed in liquid helium 16 contained in container 17.

The device is operated according to the invention by closing switch 14, closing switch 6, opening switch 14, then opening switch 6. A persistent current will then be flowing in the superconducting loop. To shut off the current in the coil, switch 14 is closed. If the current in the superconducting loop is greater than the maximum permissible value of the wire in its normal state, an alternative shut-off procedure must be used to avoid burning out the shunt wire. An appropriate alternative is merely the reverse of the turn-on procedure. That is, close switch 6, thereby canceling the current in the shunt wire, close switch 14, then slowly turn off the current flowing in the superconducting coil by use of resistor 7.

In one specic device, 5 mil diameter niobium wire was used as the superconducting wires both in the coil and shunt. The heater coil was ten turns of 20 mil diameter Nichrome wire. It was found that half an ampere through the Nichrome coil was sufficient to bring the niobium wire out of the superconducting state.

The requirements of the heating coil will vary significantly depending upon the geometry involved and, to a lesser extent, on the transition temperature of the superconductor.

The use of an electrical resistance heating wire at superconducting temperatures conventionally obtained through the use of liquid helium imposes a severe problem due to excessive vaporization of the helium bath. Accordingly, as an essential feature of this invention, an insulating sleeve is placed around the entire heating element so as to restrict the flow of liquid helium against the heater coil.

The insulating sleeve may consist of any material which is a reasonable heat insulator at the temperature of liquid helium. Glass is most satisfactory in this regard although any ceramic would be suitable. Stainless steel is also appropriate. The sleeve must be designed so as to restrict the flow of liquid helium adjacent the heating coil but must also permit a reduced flow of liquid helium to the superconducting wire when the coil is de-energized. Various sleeve designs are capable of this function. Basically the sleeve should fully enclose the heater coil except for a small opening sufficient to permit backflow of helium into the sleeve.

A significant advantage of the switch of this invention is the switching time. For instance switch-on times of a few tenths of a second to hundredths of a second are possible if the heater element and sleeve are properly constructed. While these switching times do not appear significant by usual electrical standards, they are very useful for superconducting switches. A reduced time lag between de-energizing the heating coil and switching in the persistent current during the turn-on period permits a more accurate prescription of the ultimate persistent current value.

The design feature which prescribes the switch-on time is the filling time of the sleeve. The fill-up time is determined by the size of the opening in the sleeve. For the purposes of this invention fill-up times of less than 0.3 second are considered reasonable.

The specific design of the sleeve 9 is not critical as long as the fill-up time is appropriate. The construction shown is illustrative of a particularly useful design in which two liquid openings are provided which also serve to accommodate the superconducting wire and the electrical heater leads. The sleeve may be necked down at each end or partial plugs may be inserted at the ends of a cylindrical sleeve. The sleeve is appropriately of the order of 3/16″ in diameter (I.D.). The openings at either end are preferably 1/32″ to 3/32″ in diameter. Alternatively a single hole may be provided in the sleeve with a diameter of 1/16″ to 2/16″.

Various other modifications and extensions of this invention will become apparent to those skilled in the art. All such variations and deviations which basically rely on the teachings through which this invention has advanced the art are properly considered within the spirit and scope of this invention.

What is claimed is:

1. A superconducting device comprising a superconducting coil, a current source connected to said coil, a superconducting shunt connected across said superconducting coil, liquid cooling means for maintaining the superconducting coil and the superconducting shunt below their critical temperature, electrical heater means disposed adjacent said shunt for locally heating a portion of said shunt to a temperature above its critical temperature and insulating means substantially enclosing the electrical heater means for restricting the flow of liquid coolant to the heater means.

2. The device of claim 1 wherein the insulating means comprises a heat insulating cylindrical sleeve terminating at each end in a portion of reduced diameter.

3. The device of claim 2 wherein the diameter of the reduced portions is in the range of 1/32" to 3/32".

4. The device of claim 3 wherein the insulating sleeve is composed of glass.

References Cited by the Examiner

UNITED STATES PATENTS

| | | | |
|---|---|---|---|
| 3,150,291 | 9/1964 | Laquer | 317—123 |
| 3,187,229 | 6/1965 | Kunzler | 317—123 |

MILTON O. HIRSHFIELD, *Primary Examiner.*

SAMUEL BERNSTEIN, *Examiner.*

D. YUSKO, J. A. SILVERMAN, *Assistant Examiners.*

Dedication 3,278,808.—*Murray D. Bonfeld*, Fullerton, Pa. SUPERCONDUCTING DEVICE. Patent dated Oct. 11, 1966. Dedication filed June 5, 1972, by the assignee, *Bell Telephone Laboratories, Incorporated.*

Hereby dedicates to the Public the entire remaining term of said patent.

[*Official Gazette January 2, 1973.*]